United States Patent [19]

Brana et al.

[11] 4,113,641

[45] Sep. 12, 1978

[54] CARRIER PARTICLES HAVING THE SURFACE THEREOF TREATED WITH PERFLUORO SULFONIC ACID AND METHOD OF MAKING THE SAME

[75] Inventors: George Brana, Bridgeport; John J. Russell, Woodbury, both of Conn.

[73] Assignee: Pitney-Bowes, Inc., Stamford, Conn.

[21] Appl. No.: 840,305

[22] Filed: Oct. 7, 1977

[51] Int. Cl.$^2$ .......................... G03G 9/10; G03G 9/14
[52] U.S. Cl. ............................ 252/62.1 P; 427/216; 428/403
[58] Field of Search ...................... 252/62.1 R, 62.1 P; 427/216; 428/403; 96/1.5 SD

[56] References Cited

U.S. PATENT DOCUMENTS

| | | | |
|---|---|---|---|
| 3,900,587 | 8/1975 | Lenhard et al. | 252/62.1 P |
| 3,922,381 | 11/1975 | Datta | 427/216 |
| 4,071,655 | 1/1978 | Brana et al. | 427/216 |
| 4,073,980 | 2/1978 | Westdale et al. | 428/403 |

*Primary Examiner*—John T. Goolkasian
*Attorney, Agent, or Firm*—Peter Vrahotes; William D. Soltow, Jr.; Albert W. Scribner

[57] ABSTRACT

It has been found that unexpectedly high charge to mass ratios may be achieved in a development powder if the carrier particle of the development powder is treated with a perfluoroalkyl sulfonic acid. Treating carrier particles with a monolayer of such an acid has produced charge to mass ratios of 20 to 26 $\times$ 10$^{-6}$ coulombs/gm. The acid concentration in of the solution used in this treatment has been found to be critical.

5 Claims, No Drawings

CARRIER PARTICLES HAVING THE SURFACE THEREOF TREATED WITH PERFLUORO SULFONIC ACID AND METHOD OF MAKING THE SAME

BACKGROUND OF THE INVENTION

This invention is concerned with materials that are used to develop electrostatic images on a photoconductor. With the increased use of plain paper copiers, development powders have enjoyed an increased popularity over liquid toners. Along with the increased use of development powders, magnetic brush units are becoming increasingly popular as opposed to cascading methods. Development powders used with magnetic brush units usually have an iron powder, which serves as the carrier material, and a toner that adheres to the carrier particle prior to contact with an electrostatic image. The toner usually consists of a resinous member and a coloring agent. Inexpensive, untreated iron powders cannot be used in magnetic brush systems since such iron does not have sufficient stability toward rusting and has color and triboelectric charging properties adversely effected by variable humidity conditions.

Untreated carrier particles which are employed in automatic copy machines also have carrier filming problems due to the mechanical rubbing of the carrier surface with the soft toner resins. The gradual accumulation of permanently attached film impairs the normal triboelectric charging of the toner particles in the toner mix. As a result, the toner is either less highly charged or sometimes oppositely charged giving rise to poor copy quality with a high degree of background.

In order to solve these problems, those in the art have resorted to a variety of methods for altering the carrier particle such as chemical plating and coating of the iron particles with polymers, oils, waxes and the like. Recently, there has been disclosed methods of treating the carrier particles with acids, such as fluorinated carboxylic acids, in order to prevent oxidation and modify the charge to mass ratio.

In the literature, several types of plastic coatings and electroplating of the carrier have been suggested to overcome the filming problems. Most of the prior art coating methods result in high cost and/or have other disadvantages such as yielding improper triboelectric charge properties and imparting a very high electrical resistance to the carrier that reduces its development electrode effect and results in poorly filled-in large image areas.

Of late, certain methods have been disclosed wherein increase of the charge to mass ratio of the development powder has been achieved. This is particularly true of the treatment of the carrier particle with perfluoro carboxylic acids; however, the charge to mass ratio is still not sufficient large for a relatively rapid loss of charge to mass occurs upon use of such treated carrier particles.

SUMMARY OF THE INVENTION

It has been found that unexpectedly high charge to mass ratios may be achieved in a development powder if the carrier particle of the development powder is treated with a perflouroalkyl sulfonic acid. Treating carrier particles with a monolayer of such an acid has produced charge to mass ratios of 20 to 26 × 10 coulombs/gm. The acid concentration in the solution has been found to be critical, for if more than a monolayer is obtained or if too small a quantity of treatment is not available then a high charge to mass ratio is not achieved.

BRIEF DISCRIPTION OF THE DRAWING

The single FIGURE shows a graph of the relationship between the charge to mass ratio of treated particles and the acid concentration where particles are treated according to the methods of this invention.

DETAILED DISCRIPTION OF THE INVENTION

In the art of electrostatographic imaging processing, an electrostatic latent image is formed on the recording surface of a photoconductor. The electrostatic image may then be developed by finely divide toner particles electrostaticly carried on the surface of the carrier particles. Preferably, the carrier particles are made from ferromagnetic materials such as iron powder.

It has been found that a simple adsorption treatment of iron powder with a perflouroalkyl sulfonic acid produces a treated iron which has good stability to rusting under high relatively humidity, and an unusually high charge to mass ratio of the development powder. By using the treated carrier particles of this invention an improved electro-photographic process may be obtained in those systems which require a development powder having a high charge to mass ratio. Charge to mass ratio (C/M) is defined as the ratio of the electrostatic charge created on the carrier particles during electrostatic charging thereof, relative to the mass of the toner and is measured in coulombs per gram (coul/gm).

Carrier particles treated in accordance with the method of this invention have been found to have unexpectedly high charge to mass ratios of 20 to 26 × 10 columbs/gm. This compares favorably with other perfluoro acid treatments wherein a C/M of 10 to 18 × 10 coulombs/gm was achieved. As is known in the art, the charge to mass ratio of carrier particles will increase when a development powder is first used in a copying machine, then slowly decline. The charge to mass ratio of carriers treated in accordance with the instant invention was found to be unusually high, 40 to 50 × 10 coulombs/gm, after initial use in a machine. This compares favorably against a C/M of 25 to 35 × 10 coul/gm achieved by carrier particles treated by previously known perfluoro acid treatments measured under the same conditions.

The core of the carrier particles treated in accordance with the present invention may be any material which can react chemically with perflouro sulfonic acid. Thus, by way of example, the material of the core of the carrier particle may be metallic beads, or metallic powders. As used in the specification, including the appended claims, the term metal and metallic is intended to include elemental metals as well as the oxides and carbides and other forms of metallic compounds and alloys which have a solid form.

The core of carrier particles of the preferred embodiment is a ferromagnetic material such as iron or steel, although nickel and aluminum cores have been used with good success. Other suitable ferromagnetic materials such as magnetic oxides and alloys of copper-nickel-iron, for example, also may be employed. The size of the core may be between 40 and 1,000 microns, the perferred size range being between 50 and 400 microns.

A number of solvents have been used in preparing the perflouroalkyl sulfonic acid including, 1,1,2-tricloro- 1,2,2-trifluoroethane, chloroform, and tetrahydrofuran methanol. Other appropriate solvents may be used as well. The concentration of the perflouro sulfonic acid should be such that the treatment of the carrier particle would provide a monolayer about the surface thereof. This is preferable since the adherence of the molecule upon a carrier particle is by adhesion and any excess would tend to be detrimental as the excess would easily be separated and tend to contaminate the development powder. To obtain a monolayer, the concentration would be a function of the surface area to be covered, the molecular weight of the perflouroalkyl sulfonic acid has well as the molecular dimension of the acid. It has been found that a concentration of 0.005 to 0.035 grams of acid to 100 grams of iron powder has been a satisfactory range for the material disclosed herein. Of course the volume of solution in relation to the quantity of iron is important. It has been found that for 100 gms of iron carrier particle 12.5 to 50 cc of solvent is an acceptable range. It will be understood, however, that the above range of concentration is not all emcompassing as the concentration may fall below or above the satisfactory range depending upon the acid selected and the surface area of the particles to be treated. The resulting charge to mass as a function of concentration is shown in the graph depicted in the FIGURE. In the experiments conducted to determine the relationship of C/M and acid concentration, the quantity of solvent was kept constant at 20 cc as well as the quantity of iron being treated, 100 gm. The concentration of the acid was varied by changing the amount of perflouroalkyl sulfonic acid added to the solvent. As can be seen, a definite peak is reached at about a concentration of 0.0175. It will be noted that the charge to mass ratio rises rapidly, reaches a peak, then falls slowly.

A number of commercial toners were used with the carrier particle treated in accordance with the instant invention. It was found that the treated particles serve well with any of these toners. Consequently, it does not appear that the selection of toner is important relative to the treated carrier particles provided the overall system is taken into account.

EXAMPLE I

One hundred grams of iron powder was added to a solution of 0.0075gm of perfluoroalkyl sulfonic acid dissolved in 20cc of 1,1,2-trichloro 1,2,2-trifluoroethane. The perfluoroalkyl sulfonic acid had a molecular weight of 461.97, a melting range of 115°-130° C. and a boiling point of 240° C. at 740 mmHg. The mixture was dried at 100° C. until the solvent was completely evaporated. A development powder was then prepared using 97.6 gms. of thusly treated iron and 2.4 gms. of toner made from an epoxy base resin modified with polyvinyltoluene. The resulting charge to mass ratio (C/M) was $22.3 \times 10^{-6}$ coul/gm.

EXAMPLE II-IV

Iron powder was treated as in Example I except that acid concentration was varied as indicated below and the corresponding charge to mass ratios were achieved.

|  | Concentration of acid per 20 cc of solvent | Charge to Mass (coul/gm) |
| --- | --- | --- |
| Example II | 0.015 | $25.6 \times 10^{-6}$ |
| Example III | 0.0199 | $23.1 \times 10^{-6}$ |
| Example IV | 0.03 | $20.7 \times 10^{-6}$ |

What is claimed is:

1. A carrier for electrophotographic development of latent electrostatic images, comprising particles selected from the group consisting of metal particles and metallic particles, said particles having adhered to the surface thereof a layer of perfluoroalkyl sulfonic acid.

2. The carrier of claim 1 wherein said carrier particles have a monolayer of said acid adhering to the surface thereof.

3. The carrier of claim 1 wherein said carrier particles are selected from the group consisting of iron, nickel and aluminum.

4. In a method of treating a metal or metallic electrostatic carrier particle with a perfluoroalkyl sulfonic acid, the step comprising:
   a. preparing a perfluoroalkyl sulfonic acid-solvent solution having a 0.001-0.030 concentration of a fluorinated sulfonic acid;
   b. adding the carrier particles to the solution;
   c. mixing the carrier particles within said solution; and
   d. evaporating the solution.

5. The method of claim 5 wherein the concentration of the solution is controlled to provide a monolayer about the carrier particles following the evaporation of the solution.

* * * * *